US005736259A

United States Patent [19]

Oda et al.

[11] Patent Number: 5,736,259
[45] Date of Patent: Apr. 7, 1998

[54] PACKING MATERIAL FOR HIGH-PERFORMANCE LIQUID CHROMATOGRAPHY AND PROCESS FOR PRODUCING THE SAME

[75] Inventors: Hiroshi Oda; Kiyokazu Murata, both of Hyogo, Japan

[73] Assignee: Daicel Chemical Industries, Ltd., Osaka, Japan

[21] Appl. No.: 537,912

[22] PCT Filed: Mar. 17, 1995

[86] PCT No.: PCT/JP95/00490

§ 371 Date: Oct. 20, 1995

§ 102(e) Date: Oct. 20, 1995

[87] PCT Pub. No.: WO95/25279

PCT Pub. Date: Sep. 21, 1995

[30] Foreign Application Priority Data

Mar. 17, 1994 [JP] Japan ................................ 6-47053
Mar. 17, 1995 [JP] Japan ................................ 7-00490

[51] Int. Cl.$^6$ .......................... B32B 23/04; C07H 5/04
[52] U.S. Cl. ................ 428/532; 210/500.29; 210/656; 210/730; 210/777; 428/533; 536/55.1; 536/55.3; 536/123.1; 536/127
[58] Field of Search ................ 428/423.1, 532, 428/533; 536/20, 32, 43, 45, 48, 50, 55.1, 55.3, 58, 84, 123.1, 127; 210/635, 656, 729, 730, 767, 777, 500.29, 902

[56] References Cited

U.S. PATENT DOCUMENTS

| | | |
|---|---|---|
| 2,978,446 | 4/1961 | Battista et al. ........................ 536/56 |
| 3,141,875 | 7/1964 | Battista et al. ........................ 536/56 |
| 4,912,205 | 3/1990 | Okamoto et al. ...................... 536/20 |
| 5,051,176 | 9/1991 | Miyano et al. ...................... 210/198.2 |
| 5,202,433 | 4/1993 | Okamoto et al. ...................... 540/200 |
| 5,354,852 | 10/1994 | Ikeda ...................................... 536/17.9 |
| 5,489,387 | 2/1996 | Namikoshi et al. ................... 210/635 |
| 5,491,223 | 2/1996 | Okamoto ................................. 536/18.7 |
| 5,496,437 | 3/1996 | Okamoto et al. ...................... 536/124 |

FOREIGN PATENT DOCUMENTS

| | | |
|---|---|---|
| 60-082858 | 5/1985 | Japan . |
| 60-108751 | 6/1985 | Japan . |
| 60-142930 | 7/1985 | Japan . |
| 4-75893 | 12/1992 | Japan . |
| 5-148163 | 6/1993 | Japan . |

*Primary Examiner*—H. Thi Le
*Attorney, Agent, or Firm*—Flynn, Thiel, Boutell & Tanis, P.C.

[57] ABSTRACT

A process for easily producing a packing material for high-performance liquid chromatography, which produces only a small amount of a dissolved matter. The process has a low cost and contributes to an improvement in the quality of the separated product, without reducing the separation capacity in the field of the separation of only a small amount of a dissolved matter derived from the polysaccharide derivative is obtained by washing the packing material comprising a polysaccharide coated on a carrier with a solvent.

12 Claims, No Drawings

PACKING MATERIAL FOR HIGH-PERFORMANCE LIQUID CHROMATOGRAPHY AND PROCESS FOR PRODUCING THE SAME

FIELD OF INDUSTRIAL APPLICATION

The present invention relates to a packing material for high-performance liquid chromatography and a process for producing it. In particular, the present invention relates to a packing material for high-performance liquid chromatography, which comprises a polysaccharide derivative coated on a carrier and which is characterized in that the amount of a dissolved matter derived from the polysaccharide derivative is small, and a process for producing it.

The packing material for high-performance liquid chromatography of the present invention contributes to an improvement in the quality of a separated optical isomer in the field of separation of optical isomers. The present invention provides also a process for easily producing a packing material for high-performance liquid chromatography, which only produces a small amount of a dissolved matter, without reducing the separating capacity and at a low cost by coating a carrier with a polysaccharide derivative and removing dissolved matter derived from the polysaccharide derivative with a solvent.

PRIOR ART

Packing materials for high-performance liquid chromatography can be roughly classified into those of the chemical bond type and those of the coating type.

In the packing materials of the chemical bond type, the amount of dissolved matter from a substance having the separating capacity, is usually small, since this substance is chemically bonded to a carrier.

On the other hand, a solvent in which the substance having the separating capacity is soluble cannot be used for the packing materials of the coating type, since this substance is physically absorbed on a carrier and, in addition, there is a high possibility of the peeling and dissolution of this substance depending on the process conditions. The formation of the dissolved matter should be avoided, since it causes a drift phenomenon on the base line in a chromatogram during the analysis, and it causes contamination of the separated product.

The packing material for high-performance liquid chromatography, which comprises a polysaccharide derivative coated on a carrier, is suitable for the separation of an optical isomer, and it is known that the separation capacity thereof is very high (see Japanese Patent Laid-Open Nos. 082,858/1985, 108,751/1985, 142,930/1985, etc.). However, the packing material for high-performance liquid chromatography, which comprises a polysaccharide derivative coated on a carrier, has defects in that a polymer of a relatively low molecular weight part of the polysaccharide derivative is dissolved to make the base line of the chromatogram unstable, depending on the mobile phase used, that the dissolved matter contaminates the separated product during the course of the separation and that the separation capacity deteriorates during the course of use for a long period of time.

Under these circumstances, there is a demand for the development of a packing material for high-performance liquid chromatography, which is a polysaccharide derivative coated on a carrier which forms a greatly reduced amount of the dissolved matter.

DISCLOSURE OF THE INVENTION

After intensive investigations made for the purpose of solving these problems, the inventors have found that the intended packing material can be obtained without reducing the separating capacity by coating a carrier with a polysaccharide derivative and then washing the obtained product with a specified solvent to remove dissolved matter derived from the polysaccharide derivative. The present invention has been completed on the basis of this finding.

The present invention provides a packing material for high-performance liquid chromatography, which comprises a polysaccharide derivative coated on a carrier and which is characterized in that the amount of the dissolved matter derived from the polysaccharide derivative is small.

Preferably, the amount of the dissolved matter derived from the polysaccharide is not more than 0.1 mg as determined by passing a mixed solution of n-hexane/2-propanol in a volume ratio of 9/1 through a column having an inner diameter of 1 cm and a length of 25 cm at a flow rate of 4.7 ml/min and at a temperature of 40° C., taking 564 ml of the solution and concentrating the solution to dryness; the polysaccharide derivative is a cellulose derivative; the polysaccharide derivative is selected from among celluloses, amylose, $\beta$-1,4-chitosan, chitin, $\beta$-1,4-mannan and $\beta$-1,4-xylan; 80 to 100 % of the hydroxyl groups of the polysaccharide of the polysaccharide derivative are substituted with a substituent; the polysaccharide derivative is a carbamate derivative having a urethane bond formed therein, an ester derivative having an ester bond formed therein, an ether derivative having an ether bond formed therein, or the like; and the polysaccharide derivative contains a part having a degree of polymerization of 50 to 100 in a small amount or the polysaccharide derivative has a degree of polymerization of not higher than 500.

The present invention provides also a process for producing a packing material for high-performance liquid chromatography, which comprises coating a carrier with a polysaccharide derivative and washing it with a solvent.

Preferably, the dissolved matter derived from the polysaccharide derivative is removed by washing. Namely, the packing material is washed until the amount of the dissolved matter derived from the polysaccharide is reduced to not larger than 0.1 mg as determined by passing a mixed solution of n-hexane/2-propanol in a volume ratio of 9/1 through a column having an inner diameter of 1 cm and a length of 25 cm at a flow rate of 4.7 ml/min and at a temperature of 40° C., taking 564 ml of the solution and concentrating the solution to dryness; the solvent is an aliphatic hydrocarbon, lower alcohol or a mixture of them or, in particular, the solvent is an aliphatic hydrocarbon having 1 to 8 carbon atoms, lower alcohol having 1 to 4 carbon atoms or a mixture of them; and the washing is conducted at a temperature of 50° to 70° C.

The present invention further provides a process for separating an optical isomer by high-performance liquid chromatography with a packing material which comprises a polysaccharide derivative coated on a carrier and which forms only a small amount of dissolved matter derived from the polysaccharide derivative, and also the use of the packing material which comprises a polysaccharide derivative coated on a carrier and which forms only a small amount of dissolved matter derived from the polysaccharide derivative for the separation of an optical isomer.

The polysaccharide used in the present invention may be any of natural and synthetic polysaccharides so far as it is optically active. The polysaccharide preferably has a high regularity in the bonding manner or a polysaccharide having a high purity which can be easily obtained. Examples of the polysaccharides include celluloses, amylose, β-1,4-chitosan, chitin, β-1,4-mannan and β-1,4-xylan. Among them, celluloses are particularly preferred.

The term "polysaccharide derivatives" herein indicates compounds in which 80 to 100 % of the hydroxyl groups of the polysaccharide are substituted with a substituent. The polysaccharide derivatives are, for example, carbamate derivatives having a urethane bond formed therein, ester derivatives having an ester bond formed therein, and ether derivatives having an ether bond formed therein. In the present invention, the carbamate derivatives are particularly suitably used.

Celluloses (β-1,4-glucans) which are natural polysaccharides contained in pulps or the like, and those having various molecular weight distributions are available on the market. Celluloses having a uniform molecular weight cannot be easily obtained except synthetic celluloses produced by using a bacterium. However, it is said that a microcrystalline cellulose obtained by acid hydrolysis of a pulp usually has a narrow molecular weight distribution and a high degree of crystallization due to the removal of an amorphous part therefrom, and contains only a small amount of impurities such as mannan and xylan (see U.S. Pat. Nos. 2,978,446 and 3,141,875, etc.). However, even the cellulose thus obtained can not have a monodisperse molecular weight distribution and, therefore, a derivative obtained from the cellulose has no monodisperse molecular weight distribution. A main cause for the formation of the dissolved matter in question is a relatively low-molecular weight cellulose derivative having a degree of polymerization of around 50 to 100. It is, therefore, ideal to use cellulose derivatives comprising only a small proportion of the low-molecular weight cellulose derivatives in this range and a large proportion of high-molecular ones, even though they are not the monodisperse one.

The carriers usable in the present invention are porous organic carriers or porous inorganic carriers, the latter being preferred. Suitable porous organic carriers include polymers such as polystyrenes, polyacrylamides and polyacrylates. Suitable porous inorganic carriers include synthetic and natural substances such as silica, alumina, magnesia, titanium oxide, glass, silicates and kaolin. They may be surface-treated so as to improve their affinity for the polysaccharide derivative. The surface treatment is conducted by, for example, silane treatment with an organic silane compound or surface treatment by plasma polymerization.

In the present invention, the carrier is coated with the polysaccharide derivative by, for example, dissolving the polysaccharide derivative in an organic solvent, mixing the resultant solution with the carrier by thorough stirring and distilling the organic solvent. The viscosity of the solution of the polysaccharide derivative is preferably as low as possible, since the carrier used in the present invention is porous and the polysaccharide derivative must be deposited even in the inner part of the pores. Therefore, the degree of polymerization of the polysaccharide derivative used is preferably 500 or below. Thus, the polysaccharide derivatives contain those having a degree of polymerization of around 50 to 100, which are the main cause of the formation of the above-described dissolved matter.

The polysaccharide derivative of the packing material, coated on the carrier as above described, is in the form of a very thin film (having a thickness of several ten Å). The solvent used for washing the coating layer without serous disturbance of the layer is preferably that used as a mobile phase when the packing material is used for high-performance liquid chromatography. Since a mixture of an aliphatic hydrocarbon, such as n-hexane and a lower alcohol such as ethanol or 2-propanol, is used as the mobile phase when the packing material of the present invention is usually used for the high-performance liquid chromatography, such a solvent is preferably used as the washing liquid for the packing material of the present invention. Namely, an aliphatic hydrocarbon, a lower alcohol or a mixture of them is preferably used as the washing solvent in the present invention. Among the aliphatic hydrocarbons, n-hexane is preferred from the viewpoints of the boiling point, viscosity and influence on the coating layer and, further, n-heptane, isooctane, etc. are also usable. Among the lower alcohols, 2-propanol is preferred from these viewpoints and, further, ethanol, 1-propanol, 1-butanol, etc. are also usable.

The amount of the washing liquid, which varies depending on the packing material to be handled, is usually 80 to 50 ml per gram of the packing material.

The higher the washing temperature, the higher the washing capacity. However, taking the thermal stability of the polysaccharide derivative into consideration, the washing temperature is usually preferably about 50° to 70° C. The washing time is preferably at least 3 h under the above-described conditions.

The amount of the dissolved matter formed from the packing material for the high-performance liquid chromatography of the present invention is extremely small. The guideline of the amount thereof is not more than 0.1 mg as determined by passing a mixed solution of n-hexane/2-propanol in a volume ratio of 9/1 through a column having an inner diameter of 1 cm and a length of 25 cm at a flow rate of 4.7 ml/min and at a temperature of 40° C., taking 564 ml of the solution and then concentrating the solution to dryness.

EFFECT OF THE INVENTION

The amount of the dissolved matter formed from the packing material of the polysaccharide derivative coating type of the present invention is far smaller than that formed from an ordinary packing material of the polysaccharide derivative coating type which is not washed with a solvent. Therefore, an optical isomer or the like can be separated without contamination thereof with the dissolved matter to obtain the intended product having a high quality. During analysis, the base line of the chromatogram does not drift and only a short time is taken for the stabilization to shorten the analysis time and also to reduce the amount of the solvent for the mobile phase.

EXAMPLES

The following Examples will further illustrate the present invention, which by no means limit the invention.

Synthesis Example 1

3.5 kg of cellulose (degree of polymerization: about 300) was added to 56 l of pyridine in a nitrogen atmosphere. 23.1 kg (a large excess for the cellulose) of 3,5-dimethylphenylisocyanic acid was added to the resultant mixture at 100° C., and the reaction was conducted under stirring at 105° C. for 12 h. Then, the reaction liquid was cooled. 3 l of methanol was added to the reaction liquid, and the resultant mixture was thrown into 160 l of methanol. The precipitate thus formed was recovered by filtration and dried to obtain 11.8 kg (yield: 88%) of cellulose tris(3,5-dimethylphenylcarbamate).

IR (cm$^{-1}$): 1728.7

Elementary analysis value:

C %; 64.83, H %; 6.16, N %; 6.90

Molecular weight (in terms of polystyrene):

number average molecular weight (MN): 71,000 weight average molecular weight (MW): 204,000

MW/MN: 2.88

Synthesis Example 2

10 kg of cellulose tris (3,5-dimethylphenyl-carbamate) obtained in Synthesis Example 1 was dissolved in 40 l of acetone. The solution was poured into 400 l of ethanol. The precipitate thus formed was recovered by filtration and dried to obtain 8.5 kg of cellulose tris (3,5-dimethylphenylcarbamate).

Elementary analysis value:

C %; 64.35, H %; 6.13, N %; 6.77

Molecular weight (in terms of polystyrene):

number average molecular weight (MN): 100,000 weight average molecular weight (MW): 240,000

MW/MN: 2.40

Example 1

720 g of cellulose tris (3,5-dimethylphenyl-carbamate) obtained in Synthesis Example 1 was dissolved in 4.7 l of acetone. The solution was mixed with 2,880 g of silica gel (particle diameter: 20 μm, pore diameter: 1,000 Å) treated with 3-amino-propylsilane, under stirring. After thorough mixing, the solvent was distilled off to obtain 3,580 g of a packing material (hereinafter referred to as "packing material A'").

800 g of the packing material A' was suspended in 32 l of 2-propanol, and the resultant suspension was stirred at 60° C. for 3 hour to wash it. The packing material was separated by filtration, then immersed in 10 l of n-hexane, taken by filtration and dried. The obtained product was suspended in 40 l of n-hexane/2-propanol (volume ratio: 1/1). The suspension was stirred at 60° C. for 3 hour to wash the product. The packing material thus obtained was taken by filtration, immersed in 10 l of n-hexane, separated by filtration and dried to obtain the washed packing material (hereinafter referred to as "packing material A").

The elementary analysis of the starting silica gel, and packing material A' and packing material A was conducted to obtain the results given in Table 1.

The packing material A was fed into a stainless steel column having an inner diameter of 1 cm and length of 25 cm to prepare the column packed with the packing material A (hereinafter referred to as "column A").

Then 4.7 ml/min of an n-hexane/2-propanol (volume ratio: 9/1) mixture was passed through the column immediately after the preparation at 40° C. 564 ml of the solution was taken and concentrated to dryness, and the quantity of the dissolved matter was determined. The results are given in Table 2. It is understood from Table 2 that the amount of the dissolved matter in the present invention was far smaller than that formed when the unwashed packing material was used (Comparative Example 1).

The optical resolution experiments of racemic modification given in Table 3 were conducted with column A under the conditions described below. The results are given in Table 3. It is understood from Table 3 that the separation capacity was not lower than that obtained when the unwashed packing material was used (Comparative Example 1).

mobile phase: n-hexane/2-propanol (volume ratio: 9/1)

flow rate: 4.7 ml/min detection wave length: 254 nm temperature: 40° C.

Comparative Example 1

A column packed with the unwashed packing material A' as described above (hereinafter referred to as "column A'") was prepared in the same manner as that of Example 1.

The quantity of the dissolved matter in the column A' immediately after preparation was determined in the same manner as that of Example 1. The results are given in Table 2.

Then, the optical resolution experiments were conducted in column A' n the same manner as that of Example 1. The results are given in Table 3.

Example 2

A packing material (hereinafter referred to as "packing material B'") was prepared in the same manner as that of Example 1 except that cellulose tris (3,5-dimethylphenylcarbamate) obtained in Synthesis Example 2 was used.

The packing material B' was washed with the solvent in the same manner as that of Example 1 to prepare a washed packing material (hereinafter referred to as "packing material B").

The results of the elementary analysis of the packing material B' and material B were as given in Table 1.

A column (hereinafter referred to as "column B") packed with the packing material B was prepared in the same manner as that of Example 1 except that the packing material B was used.

The quantity of the dissolved matter in the column B immediately after preparation was determined in the same manner as that of Example 1. The results are given in Table 2. It is understood from Table 2 that the quantity of the dissolved matter was far smaller than that formed when the unwashed packing material was used (Comparative Example 2).

Then, the optical resolution experiments were conducted with the column B in the same manner as that of Example 1. The results are given in Table 3. It is understood from Table 3 that the separation capacity was not lower than that obtained when the unwashed packing material was used (Comparative Example 2).

Comparative Example 2

A column (hereinafter referred to as "column B'") packed with the unwashed packing material B' was prepared in the same manner as that of Example 2.

Next, the quantity of the dissolved matter in the column B' immediately after preparation was determined in the same manner as that of Example 2. The results are given in Table 2.

Then, the optical resolution experiments were conducted with column B' in the same manner as that of Example 2. The results are given in Table 3.

TABLE 1

Results of elementary analysis

|  | C % | H % | N % | Ash % |
|---|---|---|---|---|
| Silica gel | 0.56 | 0.27 | 0.16 | 97.2 |
| Packing material A | 13.6 | 1.50 | 1.54 | 77.2 |
| Packing material A' | 13.9 | 1.46 | 1.56 | 77.2 |
| Packing material B | 13.3 | 1.48 | 1.54 | 77.5 |
| Packing material B' | 13.4 | 1.48 | 1.54 | 77.5 |

TABLE 2

Results of quantitative determination of dissolved matter

|  | Kind of packing material | Low-molecular-weight polymer (mg) | 3,5-Xylidine (mg) | Methyl 3,5-xylylcarbamate (mg) |
|---|---|---|---|---|
| Ex. 1 | packing material A | 0.015 | undetected | undetected |
| Comp. Ex. 1 | packing material A' | 2.16 | 0.034 | 0.03 |
| Ex. 2 | packing material B | 0.039 | undetected | undetected |
| Comp. Ex. 2 | packing material B' | 0.49 | 0.025 | undetected |

TABLE 3

Results of optical resolution experiment

|  |  | Racemic Separation factor* modification | | |
|---|---|---|---|---|
|  |  | t-stilbene oxide | Benzoin | flavanone |
| Packing material | | | | |
| Ex. 1 | packing material A | 2.11 | 1.47 | 1.33 |
| Comp. Ex. 1 | packing material A' | 2.12 | 1.45 | 1.32 |
| Ex. 2 | packing material B | 2.11 | 1.47 | 1.32 |
| Comp. Ex. 2 | packing material B' | 2.04 | 1.44 | 1.31 |

Note)

*Separation factor =

$$\frac{\text{(relative volume of antipode adsorbed more strongly)}}{\text{(relative volume of antipode adsorbed more weakly)}}$$

We claim:

1. A packing material for high-performance liquid chromatography, said packing material comprising a polysaccharide derivative coated on a carrier, said polysaccharide derivative being selected from the group consisting of a polysaccharide containing an urethane bond, a polysaccharide containing an ester bond, and a polysaccharide containing an ether bond; and the amount of dissolved matter derived from the polysaccharide derivative being no more than 0.1 mg, the amount of dissolved matter being determined by passing a mixed solution of n-hexane/2-propanol in a volume ratio of 9/1 through a column having an inner diameter of 1 cm and a length of 25 cm at a flow rate of 4.7 ml/min and at a temperature of 40° C., taking 564 ml of the solution and drying it.

2. A packing material according to claim 1, wherein the polysaccharide derivative is a cellulose derivative.

3. A packing material according to claim 1, wherein the polysaccharide is selected from the group consisting of cellulose, amylose, β-1,4-chitosan, chitin, β-1,4-mannan and β-1,4-xylan.

4. A packing material according to claim 1, wherein the polysaccharide derivative contains compounds having a degree of polymerization of from 50 to 100.

5. A packing material according to claim 1, wherein the polysaccharide derivative has a degree of polymerization of not higher than 500.

6. A process for producing a packing material for high-performance liquid chromatography comprising the steps of coating a carrier with a polysaccharide derivative and washing the coated carrier with a solvent, said polysaccharide derivative being selected from the group consisting of a polysaccharide containing an urethane bond, a polysaccharide containing an ester bond, and a polysaccharide containing an ether bond.

7. A process according to claim 6, wherein dissolved matter derived from the polysaccharide derivative is removed by the washing.

8. A process according to claim 6, wherein the packing material is washed until the amount of dissolved matter from the polysaccharide derivative is reduced to no more than 0.1 mg as determined by passing a mixed solution of n-hexane/2-propanol in a volume ratio of 9/1 through a column having an inner diameter of 1 cm and a length of 25 cm at a flow rate of 4.7 ml/min and at a temperature of 40° C., taking 564 ml of the solution and drying it.

9. A process according to claim 6, wherein the solvent is an aliphatic hydrocarbon, a lower alcohol having from 1 to 4 carbon atoms or a mixture of them.

10. A process according to claim 6, wherein the solvent is an aliphatic hydrocarbon having 1 to 8 carbon atoms, a lower alcohol having 1 to 4 carbon atoms or a mixture of them.

11. A process according to claim 6, wherein the washing is conducted at a temperature of 50° to 70° C.

12. A process for separating an optical isomer by high-performance liquid chromatography comprising the steps of: providing a packing material comprising a polysaccharide derivative coated on a carrier, said polysaccharide derivative being selected from the group consisting of a polysaccharide containing an urethane bond, a polysaccharide containing an ester bond and a polysaccharide containing an ether bond and the amount of dissolved matter derived from the polysaccharide derivative being no more than 0.1 mg, the amount of dissolved matter being determined by passing a mixed solution of n-hexane/2-propanol in a volume ratio of 9/1 through a column having an inner diameter of 1 cm and a length of 25 cm at a flow rate of 4.7 ml/min and at a temperature of 40° C., taking 564 ml of the solution and drying it; contacting a racemic modification containing the optical isomer with the packing material; and separating the optical isomer from the racemic modification.

* * * * *